(12) United States Patent
Bond et al.

(10) Patent No.: US 12,517,928 B1
(45) Date of Patent: Jan. 6, 2026

(54) APPROACHES OF CAPTURING AND STREAMLINING SCIENTIFIC AND SOCIAL SCIENTIFIC INVESTIGATIONS

(71) Applicant: Palantir Technologies Inc., Denver, CO (US)

(72) Inventors: Ethan Bond, New York, NY (US); Michael Nazario, New York, NY (US); Jason Marmon, New York, NY (US); Martijn Arts, Amsterdam (NL)

(73) Assignee: Palantir Technologies Inc., Denver, CO (US)

( * ) Notice: Subject to any disclaimer, the term of this patent is extended or adjusted under 35 U.S.C. 154(b) by 137 days.

(21) Appl. No.: 17/865,312

(22) Filed: Jul. 14, 2022

Related U.S. Application Data

(60) Provisional application No. 63/248,725, filed on Sep. 27, 2021.

(51) Int. Cl.
*G06F 16/28* (2019.01)
*G06F 16/2452* (2019.01)
*G06F 16/248* (2019.01)

(52) U.S. Cl.
CPC ...... *G06F 16/288* (2019.01); *G06F 16/24524* (2019.01); *G06F 16/248* (2019.01)

(58) Field of Classification Search
None
See application file for complete search history.

(56) References Cited

U.S. PATENT DOCUMENTS

| | | | |
|---|---|---|---|
| 6,952,688 B1 * | 10/2005 | Goldman | G06N 5/022 706/45 |
| 2016/0196395 A1 * | 7/2016 | Green | G16H 40/20 705/2 |
| 2020/0034375 A1 * | 1/2020 | Tung | G06N 7/01 |
| 2021/0233605 A1 * | 7/2021 | Yoshikawa | G16B 50/00 |
| 2022/0165430 A1 * | 5/2022 | Limsopatham | G06N 5/025 |
| 2022/0188520 A1 * | 6/2022 | Iso-Sipila | G06F 40/295 |
| 2023/0022673 A1 * | 1/2023 | Derzsy | G06N 5/022 |
| 2023/0177502 A1 * | 6/2023 | Gnanasambandam | G06Q 20/389 705/39 |

* cited by examiner

*Primary Examiner* — Dawaune A Conyers
(74) *Attorney, Agent, or Firm* — Sheppard Mullin Richter & Hampton LLP

(57) ABSTRACT

Computing systems methods, and non-transitory storage media are provided for ingesting data, which includes entities, within a data platform, formulating concepts associated with a subset of the entities, defining the concepts as building blocks within a framework of the data platform, categorizing the data within the concepts, and linking the concepts with one another and with the subset of the entities. The concepts include relationships among the subset of the entities.

16 Claims, 12 Drawing Sheets

APPROACHES OF CAPTURING AND STREAMLINING SCIENTIFIC AND SOCIAL SCIENTIFIC INVESTIGATIONS

CROSS REFERENCE TO RELATED APPLICATIONS

This application claims the benefit under 35 U.S.C. § 119 (e) of U.S. Provisional Application Ser. No. 63/248,725 filed Sep. 27, 2021, the content of which is incorporated by reference in its entirety into the present disclosure.

FIELD OF THE INVENTION

This disclosure relates to approaches of organizing, storing, representing, and facilitating research within a data platform. In particular, complex scientific or social scientific data are captured and represented within a framework. Relationships between entities, concepts and assertions that transcend a complexity of semantic triples are expressed, leading to further inferences and investigations.

BACKGROUND

A proliferation of research, for example, in sciences and social sciences, in particular in the life sciences, has resulted in a cornucopia of new discoveries. An estimated over three million scientific articles are published annually, a number that increases by 4% each year.[1] However, data analysis and synthesis within and related to the research may be inefficient, meaning that much of the research may be at best improperly classified and at worst undiscoverable. This limitation in accessibility of information hampers efforts not only to procure knowledge, but also to undertake new research. Therefore, a more streamlined mechanism to query results that captures complexities, nuances, and uncertainties of scientific and social scientific research elucidates scientific investigations and relationships thereof, and is a catalyst to drive formulations of new hypotheses. Under such a framework, complex expressions may be defined that transcend the limitations of semantic triples. Typically, semantic triples may be suited to define simple relationships such as "Richard is related to John," but do not easily encapsulate a complete fidelity including meanings, implications, and qualifications underlying a scientific concept, theory, or hypothesis.

[1] Johnson, R., Watkinson, A., Mabe, M.: The STM Report: An Overview of Scientific and Scholarly Publishing, Fifth Edition (2018)

SUMMARY

Various embodiments of the present disclosure can include computing systems, methods, and non-transitory computer readable media configured to implement an organizational framework within a data platform or construct (hereinafter "data platform") that is suited to capturing a scientific or social scientific concept, theory, or hypothesis (hereinafter "concept"). As one example, the concept may be in the field of life sciences. The computing systems may include one or more processors and memory storing instructions that, when executed by the one or more processors, cause the system to define, as an elemental building block of data, a concept rather than a rudimentary object. For example, a concept may be that penicillin treats headaches in some situations, rather than simply identifying entities such as "penicillin" or "headaches." Thus, the computing systems implement a new paradigm.

The computing systems, methods, and non-transitory computer readable media may perform: ingesting data within a data platform, the data comprising entities; formulating concepts associated with a subset of the entities, the concepts comprising relationships among the subset of the entities; defining the concepts as building blocks within a framework of the data platform; categorizing the data within the concepts; and linking the concepts with one another and with the subset of the entities.

In some embodiments, the concepts further comprise one or more qualifications applied to a subset of the entities or the relationships.

In some embodiments, the formulating of the concepts is based at least in part on a user input indicative of one or more of the concepts.

In some embodiments, the formulating of the concepts is based at least in part on inferences using a trained machine learning model; and the training of the machine learning model is based on a first training dataset comprising properly inferred concepts and a second training dataset comprising improperly inferred concepts.

In some embodiments, the instructions further cause the system to perform: determining levels of reliability of two of the concepts; and in response to determining that the levels of reliability of the two of the concepts satisfy a threshold level, inferring a new concept that combines the two of the concepts.

In some embodiments, the instructions further cause the system to perform: inferring, based on the concepts, a potential concept or subconcept that is unsupported by the data.

In some embodiments, the instructions further cause the system to perform: determining a protocol comprising parameters to test the potential concept based at least in part on protocols used to test the concepts; and transmitting the protocol to one or more other processors to carry out the protocol.

In some embodiments, the instructions further cause the system to perform: receiving an indication of one or more subconcepts that further elaborate on an aspect of an entity of the entities or a relationship of the relationships; storing associated data within the one or more subconcepts; and linking the one or more subconcepts to a corresponding concept.

In some embodiments, the instructions further cause the system to perform: receiving a request from a user to query within a concept of the concepts; determining an access control level of the user specific to the concept; in response to determining that the user satisfies the access control level, conducting the query; retrieving data in accordance with the request; and transmitting the data to the user.

In some embodiments, the categorization of the data comprises storing corresponding textual and multimedia data in association with the concepts.

These and other features of the computing systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIGS. 2A and 2B may be implemented together in some embodiments, and illustrate different aspects of the data representation. FIG. 2A illustrates a representation of data using concepts as building blocks, while FIG. 2B illustrates a representation of individual entities that form the concepts.

FIG. 3A illustrates a representation of a concept within, or associated with, a compute environment. FIG. 3B illustrates how a concept may be modified as a result of changes in the underlying data. FIG. 3C illustrates how a concept may be modified even when the underlying data remains constant.

DETAILED DESCRIPTION

Figure 1:
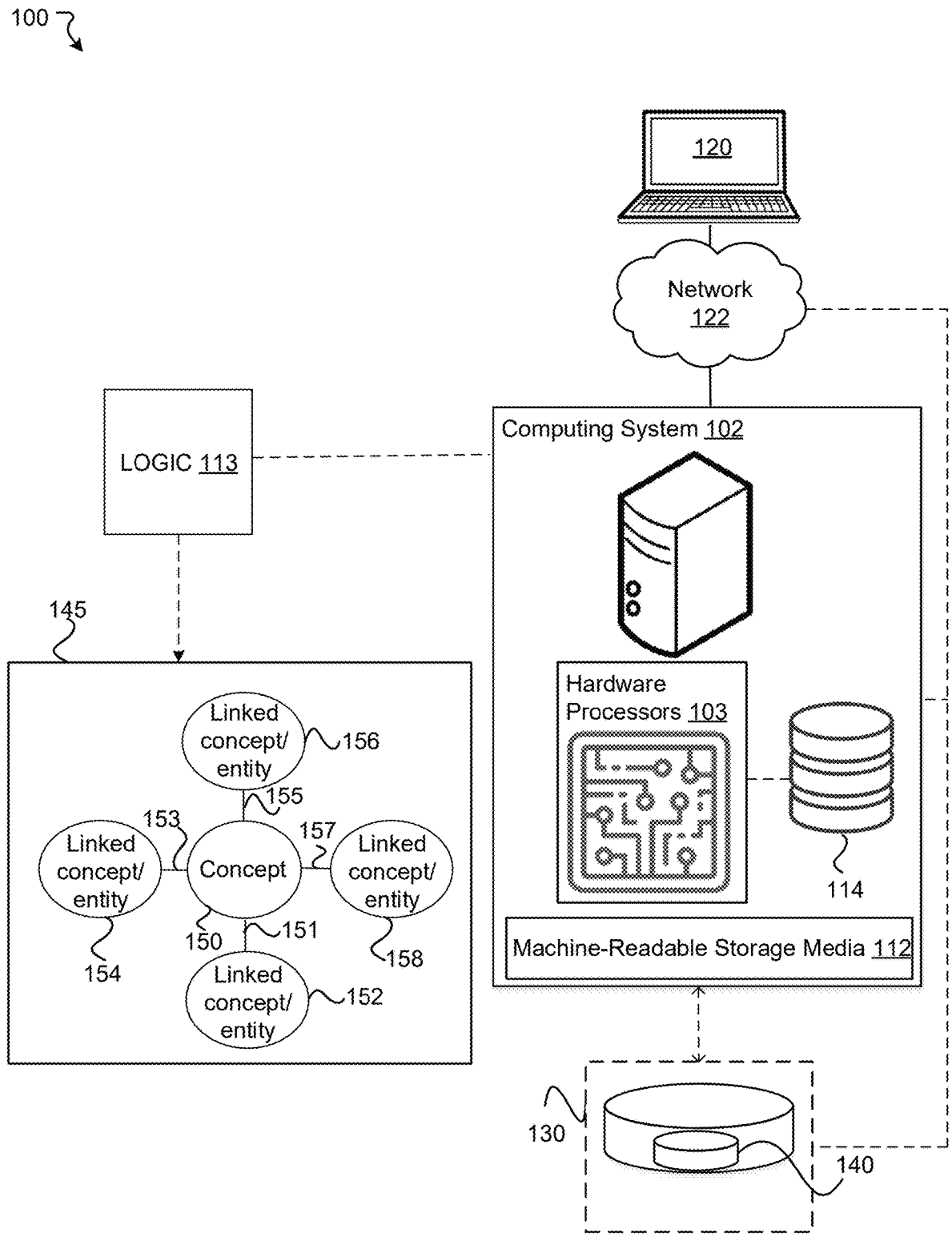
FIG. 1 illustrates an example environment 100, in accordance with various embodiments, of a computing system that implements a representation, organization, or categorization of data within a data platform.

Conventional approaches of organizing and disseminating scientific research relies largely on semantic triples, which may be manifested as objects or nodes and links between objects. Such a framework may be used in databases such as Gene Ontology or ChEMBL (Chemistry European Molecular Biology Laboratory). For example, a concept such as "penicillin treats headaches" may be represented as two objects, "penicillin" and "headaches," and a link that signifies "treating." However, scientific concepts are rarely so straightforward, and such an oversimplification reduces a value of the informational content and erodes a level of trust or confidence. In particular, semantic triples are ill suited in representing a detailed scientific concept, such as, "a certain dosage, taken at a particular frequency, of penicillin treats headaches a given percentage of the time, and may further be impacted by factors such as age and medical history of a subject." In addition, attempting to query such a concept may also be painstakingly difficult, if not impossible, when the fundamental building blocks consist of only single objects or entities.

Additionally, such conventional approaches may fail to adequately document provenance of scientific research. For example, in typical scientific databases, an entity such as "penicillin" or "headache," or a semantic triple that expresses a concept, such as "penicillin treats headaches," may be devoid of further documentation indicating sources that support or disprove the concept. Such a deficiency not only erodes confidence of a veracity or completeness of the databases, but also hinders further efforts to expand on or investigate the concept. Even if a concept includes some documentation regarding publications that support the concept, the concept may still fall short in terms of trustworthiness because publications sometimes only contain limited scientific knowledge, data, and underlying logic. In particular, a scientific paper or publication may be limited to a single projection of a body of scientific work, and may not reveal all the associated scientific processes and/or discoveries.

To address such shortcomings, a new approach includes, defining a new framework which implements, as a building block, concepts rather than individual entities. In some embodiments, herein, each concept may be construed to incorporate multiple entities or terms (hereinafter "entities"), one or more relationships among the multiple entities, and/or further qualifications applied to a subset of the entities and/or relationships. The relationships may include, for example, ontological relationships, causal relationships, or correlative relationships, and/or may be expressive of a scientific theory, conjecture, or explanation. Applying the aforementioned penicillin example, a concept may encompass, "penicillin treats headaches a given percentage of the time." Here, "penicillin" and "headaches" may refer to entities and "treats" may refer to a relationship, while "a given percentage of the time" may refer to a further qualification of treating. A concept may also include additional complexity such as, "a certain dosage, taken at a particular frequency," which further qualifies the entity penicillin. A scale or complexity of a building block may be determined and/or dynamically adjusted based on an amount and/or a nature of data to be represented. For example, if an amount of data regarding penicillin treating headaches is extensive, then a concept within the building block may have higher specificity and/or complexity, and/or be linked to more additional entities. For example, the concept may include, "a particular dosage of penicillin taking at a given frequency treats mild to moderate headaches 60% of the time." However, if an amount of data regarding penicillin treating headaches is more limited, then a concept within the building block may have lower specificity and/or complexity, and/or be linked to fewer additional entities. For example, the concept may be limited to, "penicillin sometimes may treat headaches." In some embodiments, the concepts, rather than individual entities, may be represented as nodes. The concepts may embody claims or assertions of facts or discoveries, and may include phrases or sentences.

Encapsulated or stored within the concepts may be underlying research, including articles, publications, and other data specifying protocols and/or parameters of the underlying research. The other data may provide additional context to augment the publications due to the aforementioned limitations of publications alone. In particular, even published research may not fully describe protocols and/or parameters used to carry out the research, including preparation of instruments prior to an experiment and/or cleanup of instruments following the experiment. As a result, more than 70% of researchers have tried and failed to reproduce another scientist's experiments, and more than half have failed to reproduce their own experiments.[2] Moreover, most scientific discoveries or efforts may not even get projected or reflected into a publication due to enormous monetary and time expenditures and selectivity criteria of publications. Even when data is being published, the published data reflects nowhere close to an entire body of findings during an experiment. Thus, by further encapsulating other data that goes beyond even published research, the concepts would be augmented by contextual information that helps further elucidate the published research findings. For example, the contextual information would uncover factors that might lead to variability of results, and/or how certain protocols and/or parameters may be adjusted in future experiments. Additionally, the contextual information may include textual and multimedia data. In some embodiments, a viewer who accesses the contextual information may be provided a richer perspective, for example, of actually being in a lab or experiencing an experiment or research first-hand, rather than only relying on a static projection manifested in a paper or publication.

[2] Baker, Monya. 1,500 scientists life the lid on reproducibility. Nature 533, 452-454 (25 May 2016).

Each of the concepts may encapsulate, and/or be associated with and correspond to supporting data and reasoning to substantiate and/or elaborate upon the concepts. The concepts, supporting data, and reasoning of each individual concept may constitute part of, or be associated with, an independent compute environment. The independent compute environment may include infrastructure and resources to independently perform data recording, storage, and analysis on each individual concept itself, apart from other independent compute environments. In some embodiments, within each compute environment, the supporting data and reasoning, and modifications of the concept, may be time-stamped to indicate a time of ingestion. For example, a first body of data may be ingested into the independent compute environment at a first time instance, and reasoning applied to the first body of data to arrive at a concept. When a second body of data is ingested into the independent compute environment, or if the reasoning applied has changed, the concept may be modified by applying reasoning to the combined first and second bodies of data. The modifications may be automatic or in response to a manual input such as a user input. Each compute environment records a chronological sequence of when and how the concept is updated, particular contents and times of ingestion of data and/or other parameters, and reasoning applied to the data and/or other parameters. As another example, if a portion of data has been partially or entirely invalidated, the compute environment may modify the existing concept without having to introduce a new concept. Therefore, in each compute environment, changes in the concept may be correlated or linked to changes in the data, reasoning, and/or other parameters.

In some embodiments, analytical capabilities within each compute environment may include evaluating a validity of concepts based on the supporting data and reasoning, and/or inferring additional related concepts from the supporting data and reasoning. Thus, each of the concepts need not be linked to other concepts in order to perform data analysis. In contrast, under conventional approaches, each individual node, which represents an object, does not embody additional data and logic, and cannot exist independently from other nodes in its own compute environment.

The concepts may further be linked to additional entities, subentities, subconcepts, and/or further contextual information related to the concepts. The links may indicate a nature or type of connection or relationship between the concepts and/or entities, subentities, subconcepts, or related concepts. In some embodiments, the concepts may be linked to information relating to sources or authorities of the underlying research, such as, other data or publications generated by a same author. The concepts may also be linked to potentially related entities. As another example, the concept "penicillin treats headaches" may be linked to additional entities related to "penicillin" or "headaches," such as tetracyclines, quinolones, macrolides, aminoglycosides, or glycopeptides (e.g., penicillin alternatives), or fevers, nausea, or chills (e.g., related symptoms). Additionally or alternatively, the concept "penicillin treats headaches" may be linked to subentities or subclassifications such as penicillin G or V, nafcillin, or oxacillin (e.g., specific types of penicillin). Moreover, the concept "penicillin treats headaches" may be linked to subconcepts such as, an effectiveness of penicillin treating headaches within a certain age or demographic population. The aforementioned concepts and links may be identified by a user or be inferred or predicted, for example, via a trained machine learning model.

Using the aforementioned representation of concepts, researchers may be able to disseminate their findings without the painstaking effort and Gargantuan cost of undergoing a publication process. The findings are not mere assertions but rather are substantiated by supporting data and reasoning. Additionally, a chronological sequence of, or related to the concepts, which indicate a progression of the research, may be captured, tracked and/or maintained. Moreover, the retention of the concepts may increase an availability and a breadth of scientific data. Because the concepts are not filtered based on subject matter or an extent of novelty, results that may not be published because they are not "interesting" or "groundbreaking" enough are nonetheless disseminated. The dissemination of such results may nonetheless be instructive to guide further research.

FIG. 1 illustrates an example environment 100, in accordance with various embodiments, of a computing system that implements an organization or framework within portions or segments of the data platform. The example environment 100 can include at least a computing system 102 and at least one computing device 120. The computing system 102 and the computing device 120 can each include one or more processors and memory. Processors can be configured to perform various operations by interpreting machine-readable instructions, for example, from a machine-readable storage media 112. The processors can include one or more hardware processors 103 of the computing system 102. The hardware processors 103 may be linked to a machine learning model or component 107. The hardware processors 103 may further be connected to, include, or be embedded with logic 113 which, for example, may include the particular protocol that is executed to carry out the functions of the hardware processors 103. These functions may include ingesting data, such as scientific or social scientific data, organizing the data, analyzing the data, which may include running queries or performing inferences, and/or filling in gaps in research within at least a segment 140 of one or more data platforms 130. The filling in of the gaps may include suggesting or inferring particular missing concepts, designing new experiments, studies or investigations (hereinafter "experiments"), and/or implementing the new experiments. Although one segment 140 is shown for purposes of simplicity, the one or more data platforms 130 may be understood to include multiple segments. As an example, one segment may include, and/or store data related to, a particular concept or set of related concepts, or entities. For example, one segment may include data related to penicillin or antibiotics, or, a particular concept such as penicillin treating headaches. Operations within each of the segments may be simultaneously coordinated and/or managed by the hardware processors in a same or similar manner as described with reference to the segment 140.

The data platform 130 may be divided into segments, such as the segment 140. The demarcation of resources in the data platform 130 into segments, such as the segment 140, provides clear delineations classification levels and/or access constraints of each of the segments. In some embodiments, information in each segment may be classified and accessible only to a certain population of users of particular privileges and/or classification levels. As an example, one segment may have a classification level of "confidential," while another segment may have a classification level of "top secret." A classification level of a segment may indicate or define a maximum classification level of resources that are permitted within the segment. In particular, if one segment has a classification level of "confidential," then resources classified up to and including, or, at or below a level of, "confidential" may be permitted to be ingested into the segment while resources classified at a level higher than "confidential" may be blocked or restricted from being ingested into the segment. Additionally or alternatively, each segment may be particularly tailored to or restricted to storage and management of resources having a particular purpose and/or of a particular subject matter. As an illustrative example, the segment 140 may include resources of cancer research subject matter. The segment 140 may further include sub-segments that individually include lymphoma and leukemia subject matter. Such a merging of lymphoma and leukemia resources within the segment 140 may be desirable, for example, in collaborative scenarios. Alternatively, the segment 140 may include lymphoma resources, while another segment includes leukemia resources. Such segregation of lymphoma and leukemia resources in different segments may be desirable in scenarios in which access to, dissemination, and/or release of lymphoma resources are to be determined and managed separately from those of leukemia resources, and only users that are working in those respective fields may have access to the segments.

As shown in FIG. 1, the one or more hardware processors 103 may include and carry out logic 113 to implement functions of ingesting data, such as scientific or social scientific data, organizing the data, analyzing the data, which may include running queries or performing inferences, and/or filling in gaps in research. In a particular manifestation or representation 145 of an organization of the data, a concept 150, such as, "penicillin treats headaches," may be linked to other linked concepts or entities 152, 154, 156 and/or 158 via respective links 151, 153, 155, and/or 157. Other concepts or entities may include, "penicillin treats neck pain," "alternatives to penicillin treat headaches," and/or further subconcepts, such as, "penicillin treats headaches in 60% of patients between ages 14 and 64." In some embodiments, a level of granularity of the concept 150 may be increased. For example, the concept 150 may include, "penicillin treats mild headaches in 60% of patients."

In general, the logic 113 may be implemented, in whole or in part, as software that is capable of running on one or more computing devices or systems such as the hardware processors 103, and may be embedded within the machine-readable storage media. In one example, the logic 113 may be implemented as or within a software application running on one or more computing devices (e.g., user or client devices) and/or one or more servers (e.g., network servers or cloud servers). The logic 113 may analyze or evaluate an input, such as a user input, regarding a concept and/or an access constraint or classification level associated with a segment in which the concept is stored. For example, if a concept such as "penicillin fails to treat headaches" is entered, the logic 113 may determine that such a concept runs counter to an existing concept and may either invalidate or flag such an entry. Additionally, the logic 113 may receive an input of constraints and/or classification levels, and evaluate and/or validate the input to determine whether the input matches existing permitted constraints and/or classification levels. For example, an input of "top secret" may be invalidated because "top secret" is not stored as a possible classification level. In some embodiments, the logic 113 may generate, or define, with or without input, constraints and/or classification levels of the segment 140 based on previous constraints and/or classification levels of other similar or related segments, for example, of similar subject matter and/or types of data resources. For example, if the segment 140 includes resources of medical data such as lung cancer data, the logic 113 may generate constraints and/or classification levels of the segment 140 to be same or similar as those in other segments that include resources of other medical data such as pancreatic cancer data. The generated constraints and/or classification levels of the segment 140 may be modified, for example, by a user.

Meanwhile, the logic 113 may determine or ensure that a request to ingest a resource into the segment 140 is proper and conforms to the constraints and/or classification levels. In some embodiments, the logic 113 may ensure that a resource would conform to the constraints and/or classification levels within the segment 140 before permitting or authorizing the ingestion of the resource into the segment 140. In some embodiments, the logic 113 may still permit the ingestion of a resource that violates such constraints and/or classification levels.

Additionally, the logic 113 may ensure that a user requesting the ingestion of a resource has appropriate editing permissions or authorization on that resource. In another exemplary manifestation, the logic 113 may determine whether, and/or to what degree, a user requesting access to a particular resource within the segment 140 is actually authorized to do so. For example, the logic 113 may determine that even though a user satisfies a clearance level corresponding to a classification of the segment 140, the user may not satisfy a dissemination or release control. The logic 113 may implement restrictions such as prohibiting the user from viewing or editing contents of resources within the segment 140, prohibiting the user from viewing an existence of resources within the segment 140, and/or generating tearlines to purge contents of resource portions that fail to satisfy a dissemination or release control.

In some embodiments, the computing system 102 may further include a database or other storage (hereinafter "database") 114 associated with the hardware processors 103. In some embodiments, the database 114 may be integrated internally with the hardware processors 103. In other embodiments, the database 114 may be separate from but communicatively connected to the hardware processors 103. The database 114 may store information such as the data that is ingested, and data generated from the hardware processors 103, such as analyzed data, inferences of data, such as additional proposed concepts or experiments. The information may be retrieved by the hardware processors 103, and/or accessible by other hardware processors within the computing system 102, or other computing systems. The other hardware processors or other computing systems may use the information to perform downstream functions such as carrying out a new experiment proposed and stored within the database 114.

In general, an entity or a user operating a computing device 120 can interact with the computing system 102 over a network 122, for example, through one or more graphical user interfaces and/or application programming interfaces. In some instances, one or more of the hardware processors 103 may be combined or integrated into a single processor, and some or all functions performed by one or more of the hardware processors 103 may not be spatially separated, but instead may be performed by a common processor.

Figure 2A:
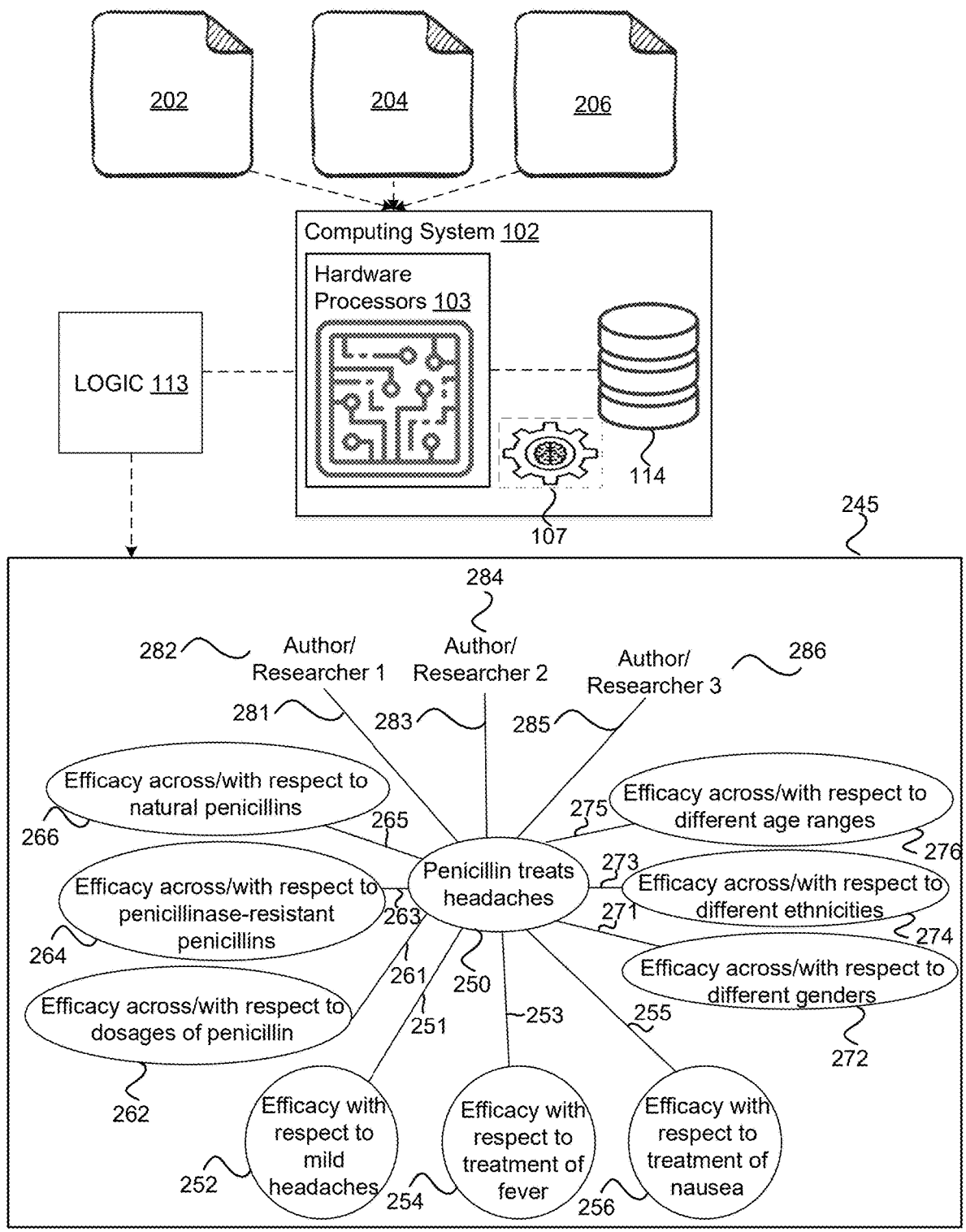
FIGS. 2A-2B illustrate, in accordance with various embodiments, exemplary operations of representing, organizing or categorizing data following ingestion into the data platform.

FIG. 2A illustrates an exemplary operation of the logic 113 to organize or categorize data following ingestion, further clarifying the representation 145 illustrated in FIG. 1. Although the examples in FIG. 2A and subsequent FIGURES focus on life sciences implementations, in particular, penicillin, the implementations described in FIG. 2A and subsequent FIGURES are not to be construed as being limited to penicillin or life sciences, and are merely depicted to elucidate principles of an exemplary embodiment. The ingested data may include papers or publications and contextual data missing from the publications such as parameters and protocols under which an experiment or study was conducted, and/or multimedia data associated with the running of the experiment or study, as will be illustrated in FIGS. 3A-3C. The logic 113 may accept an input from a user regarding concepts, which may be embodied in a scientific assertion such as, "penicillin treats headaches." In some embodiments, the logic 113 may evaluate a strength and/or relevance of the scientific assertion based in the ingested data. For example, the logic 113 may evaluate to what extent the ingested data supports and/or is relevant to the user-entered scientific assertion. This evaluation may be based at least in part on an absolute and/or relative amount, and/or a nature of, data that supports and counters the scientific assertion. The logic 113 may validate the scientific assertion if the scientific assertion satisfies a strength and/or a relevance threshold. Alternatively, the logic 113 may accept the scientific assertion from the user without validating, or, accept an input from a user indicating a strength and/or relevance of the scientific assertion.

In some embodiments, the logic 113 may, without input from a user, generate or suggest concepts, such as scientific assertions, based on the ingested data. For example, if a majority or a substantial portion of the ingested data may support a scientific assertion that penicillin treats headaches, the logic 113 may generate or suggest such a scientific assertion. In particular, if a strength and/or relevancy of the scientific assertion exceeds respective thresholds, the logic 113 may generate or suggest such a scientific assertion. In some embodiments, this scientific assertion may, or may not be, validated or confirmed by a user.

The logic 113 may define the concept as a building block of a framework within the segment 140 of the data platform 130. For example, as illustrated in FIG. 2, the logic 113 may organize data according to an exemplary representation 245. The logic 113 may define a concept 250, for example, "penicillin treats headaches," as a building block from which to link other concepts, entities, subentities and/or subclassifications. The logic 113 may accept an input from a user regarding the linked concepts, entities, subentities and/or subclassifications, and/or may infer linked concepts, entities, subentities and/or subclassifications. As illustrated in FIG. 2, each axis of the representation 245 may include a different type, category, or aspect of a linked concept, entity, subentity and/or subclassification. In particular, a first axis at a bottom side of the representation 245 may include concepts 252, 254, and/or 256 that are further subclassifications of, or related to, one of the entities "headache" within the concept 250. The concept 252 may be indicative of an efficacy of penicillin in treating headaches specifically pertaining to mild headaches. The concept 254 may be indicative of an efficacy of penicillin in treating fever. The concept 256 may be indicative of an efficacy of penicillin in treating nausea. These concepts are linked to the concept 250 via respective links 251, 253, and 255, which indicate further subclassifications of one of the entities "headache," such as a mild headache, and other related entities of the entity "headache."

Meanwhile, a second axis at a left side of the representation 245 may include concepts 262, 264, and/or 266 that are further subclassifications of, further elaborate on, or are otherwise related to another of the entities "penicillin" within the concept 250. The concept 262 may be indicative of an efficacy of treating headaches across different dosages and/or with respect to dosages of penicillin. The concept 264 may be indicative of an efficacy of treating headaches across different natural penicillins and/or with respect to specific classes or types of natural penicillins. Meanwhile, the concept 266 may be indicative of an efficacy of treating headaches across different natural penicillins and/or with respect to specific classes or types of natural penicillins. These concepts are linked to the concept 250 via respective links 261, 263, and 265, which indicate further subclassifications or elaborations of one of the entities "penicillin," such as natural penicillins, penicillinase-resistant penicillins, and dosages of penicillins.

Meanwhile, a third axis at a right side of the representation 245 may include concepts 272, 274, and/or 276 that are further subclassifications of, further elaborate on, or are otherwise related to the concept 250. For example, the concepts 272, 274, and 276 may include different categories of subjects upon which the concept 250 may be tested. The concept 272 may indicate an efficacy of treating headaches across different genders, or with respect to a particular gender. The concept 274 may indicate an efficacy of treating headaches across different ethnicities, or with respect to a particular ethnicity. The concept 276 may indicate an efficacy of treating headaches across different age ranges, or with respect to a particular age range. The concepts 272, 274, and 276 may be linked to the concept 250 via links 271, 273, and 275, which indicate that the concepts 272, 274, and 276 are further subclassifications of, further elaborate on, or are otherwise related to the concept 250.

A fourth axis at a right side of the representation 245 may include entities 282, 284, and 286, which further define certain attributes of the concept 250 and are linked to the concept 250 via links 281, 283, and 285. In particular, the entities 282, 284, and 286 indicate authors or researchers of, or responsible for, underlying data and publications within the concept 250, or to which data within the concept 250 has been attributed.

Underlying data, such as publications, and unpublished data including textual data and multimedia data, may be stored or encapsulated within each of the concepts 250, 252, 254, 256, 262, 264, 266, 272, 274, and 276, and organized according to the aforementioned concepts, as will be illustrated in FIG. 3. As alluded to above, the logic 113 may, with or without an input from a user, categorize the underlying data within one or more of the concepts 250, 252, 254, 256, 262, 264, 266, 272, 274, and 276. The aforementioned concepts may be represented as nodes. Access control levels or policies of the underlying data within one or more of the concepts 250, 252, 254, 256, 262, 264, 266, 272, 274, and 276 may differ. In particular, access control levels or policies of the underlying data within a subset (e.g., some or all) of the concepts 250, 252, 254, 256, 262, 264, 266, 272, 274, and 276 may be stricter compared to access control levels or policies of the respective concepts 250, 252, 254, 256, 262, 264, 266, 272, 274, and 276 themselves. A user may, for example, request to access or query underlying data within a concept 250, 252, 254, 256, 262, 264, 266, 272, 274, and 276 by selecting a node corresponding to that concept. The logic 113 may evaluate whether or not, and an extent to which, a user has access to the underlying data based on the access control levels or policies and attributes of the user. In response to determining that the user satisfies the access control level, the logic 113 may be implemented to conduct the query and retrieve data in accordance with the request. The data may be transmitted to a user requesting the query.

One benefit realized from the representation 245, in which concepts form the building blocks, is that inferences may be formulated, generated, or proposed across different concepts. For example, if a scientific assertion "A causes B" is linked to another scientific assertion "B causes C," and both scientific assertions are of at least a threshold confidence level or reliability, then a logical inference that "A causes C" may be formulated or generated. In another scenario, if a scientific assertion "A causes B" with certain qualifications and/or confidence level is linked to another scientific assertion "B causes C" with other qualifications and/or confidence level, then the logic 113 may propose a logical inference that "A causes C" for further testing, and determine one or more experiments to carry out such testing based on the protocols or parameters stored within the underlying data. Such a benefit would be difficult, if not impossible to achieve, under a standard semantic triplet representation, in which entities, rather than concepts, form the building blocks or nodes.

Figure 2B:
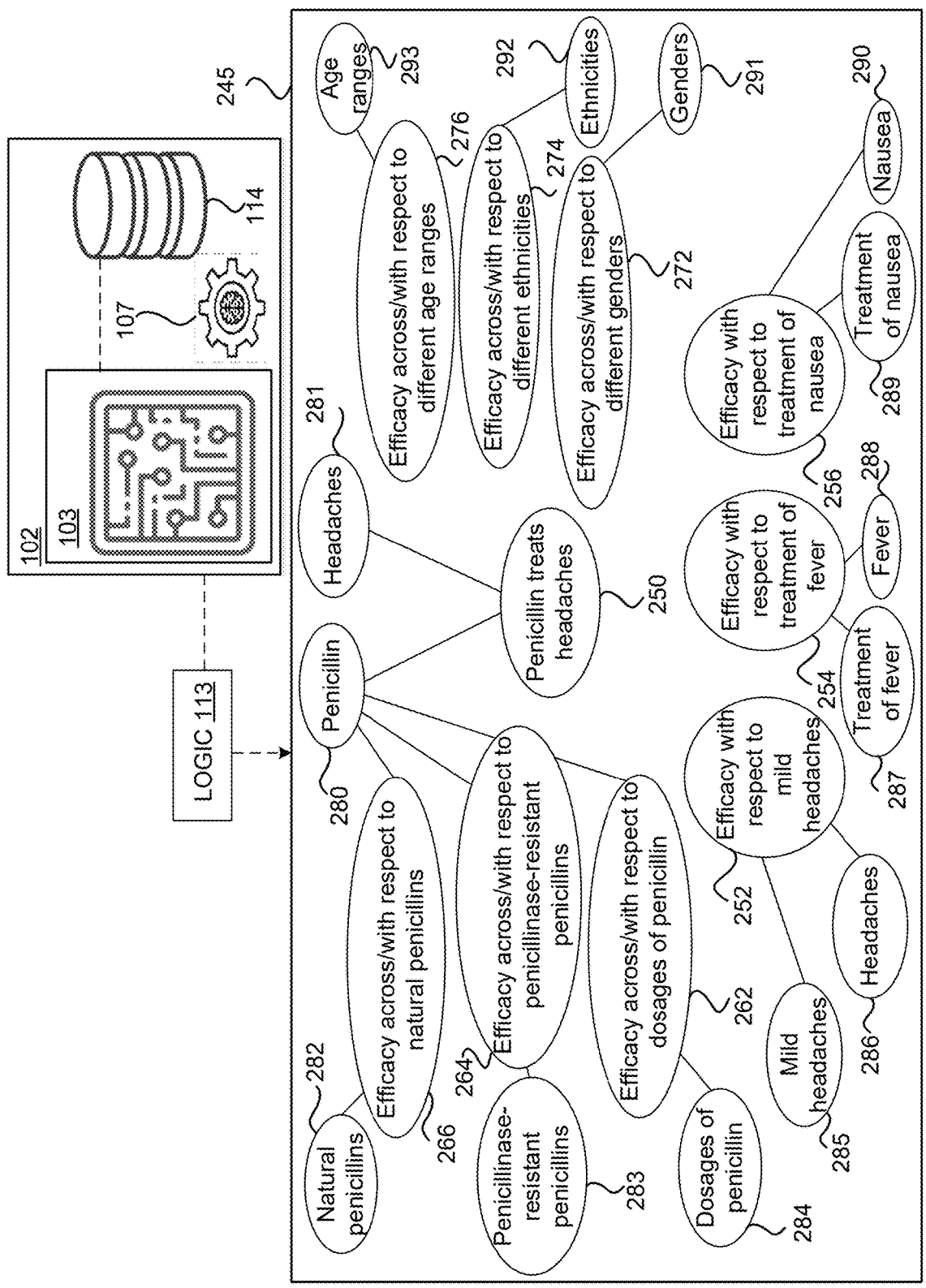

In some embodiments, the representation 245 may additionally include entities themselves and subclassifications thereof, such as nouns and pronouns, that are used to generate or formulate the concepts, as illustrated in FIG. 2B. The entities may be represented by nodes 280, 281, 282, 283, 284, 285, 286, 287, 288, 289, 290, 291, 292, and 293, and correspond to "penicillin," "headaches," "natural penicillins," "penicillinase-resistant penicillins," "dosages of penicillin," "mild headaches," "headaches," "treatment of fever," "fever," "treatment of nausea," "nausea," "genders," "ethnicities," and "age ranges," respectively. Each of the nodes 280, 281, 282, 283, 284, 285, 286, 287, 288, 289, 290, 291, 292, and 293 representing entities may be linked to the corresponding concepts that refer to or mention the entities. For example, the node 280 representing "penicillin" may be linked to the concepts 250, 252, 262, 264, and 266, which mention and refer to penicillin or a variant of penicillin. In some embodiments, entities, or nodes representing the entities, may be linked to concepts that include underlying data referencing the entities, even if the concepts themselves do not refer to the respective entities. For example, the node 280 representing "penicillin" may be linked to a concept "antibiotics cause sleep deprivation" if the concept includes or is supported by underlying data of penicillin. However, the nodes 280, 281, 282, 283, 284, 285, 286, 287, 288, 289, 290, 291, 292, and 293 may not be linked to one another, because any linkages among the entities are already captured within the concepts. The nodes 280, 281, 282, 283, 284, 285, 286, 287, 288, 289, 290, 291, 292, and 293 may facilitate searching or indexing. In some embodiments, if the computing system 102 receives a search query, for example, by a user operating the computing device 120, the logic 113 may return, as results, any concepts that are linked to the search query. For example, if a search query is "penicillin," then the logic 113 may return the concepts 250, 252, 262, 264, and 266. In some embodiments, the logic 113 may additionally return concepts that do not mention "penicillin" but refer to "penicillin" in underlying data.

Although the entities themselves are illustrated only in FIG. 2B but not in other FIGURES for the sake of simplicity, the existence and representation of the entities may be implemented in conjunction with the representations in other FIGURES, such as in FIGS. 2A, 3A, 3B, 3C, 4, 5, and 6.

Figure 3A:
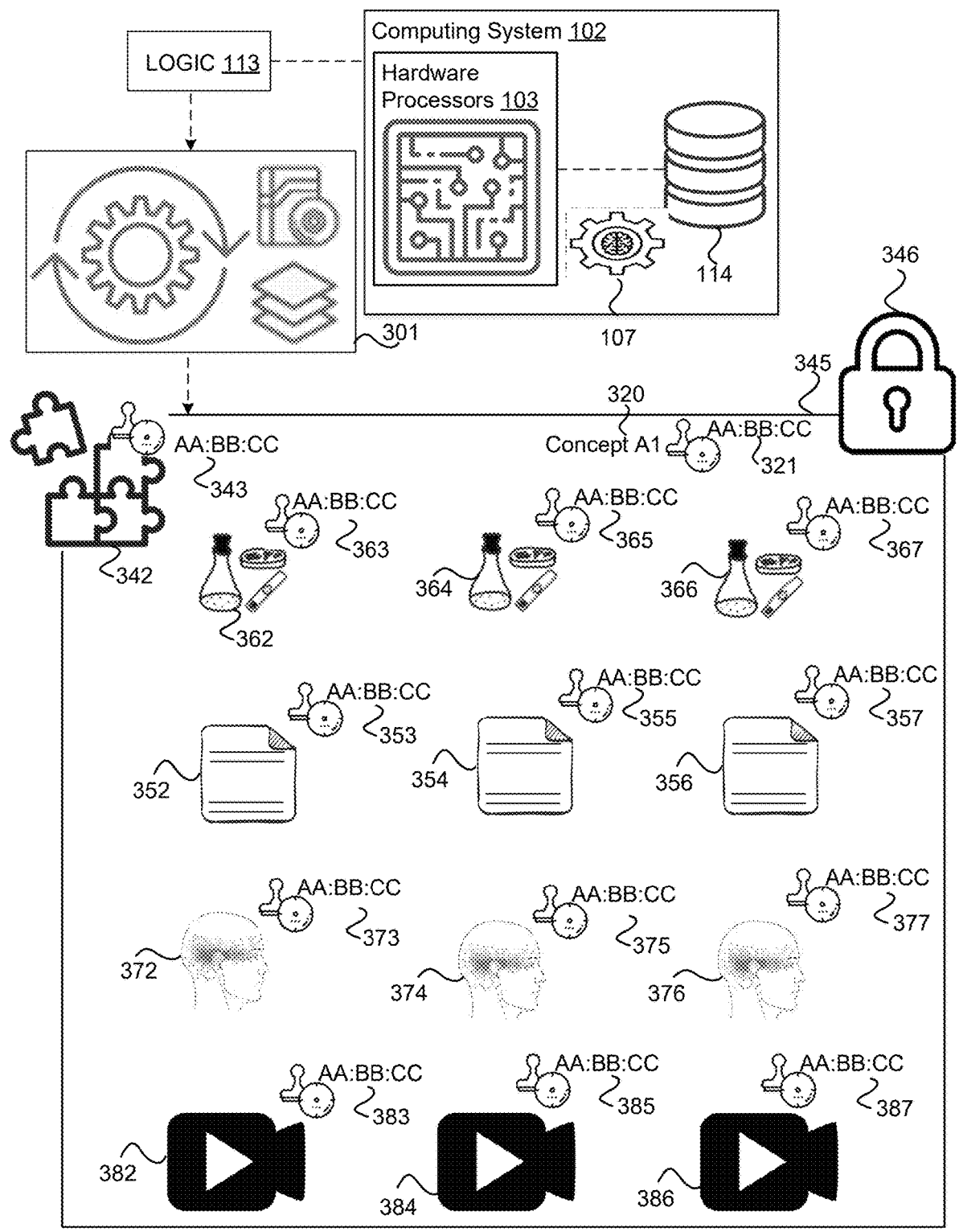
FIGS. 3A-3C illustrate, in accordance with various embodiments, exemplary operations of storing or encapsulating underlying data within each of the concepts, and organizing the underlying data according to the concepts, in which each individual concept or representation thereof constitutes part of an independent compute environment.
Figure 3B:
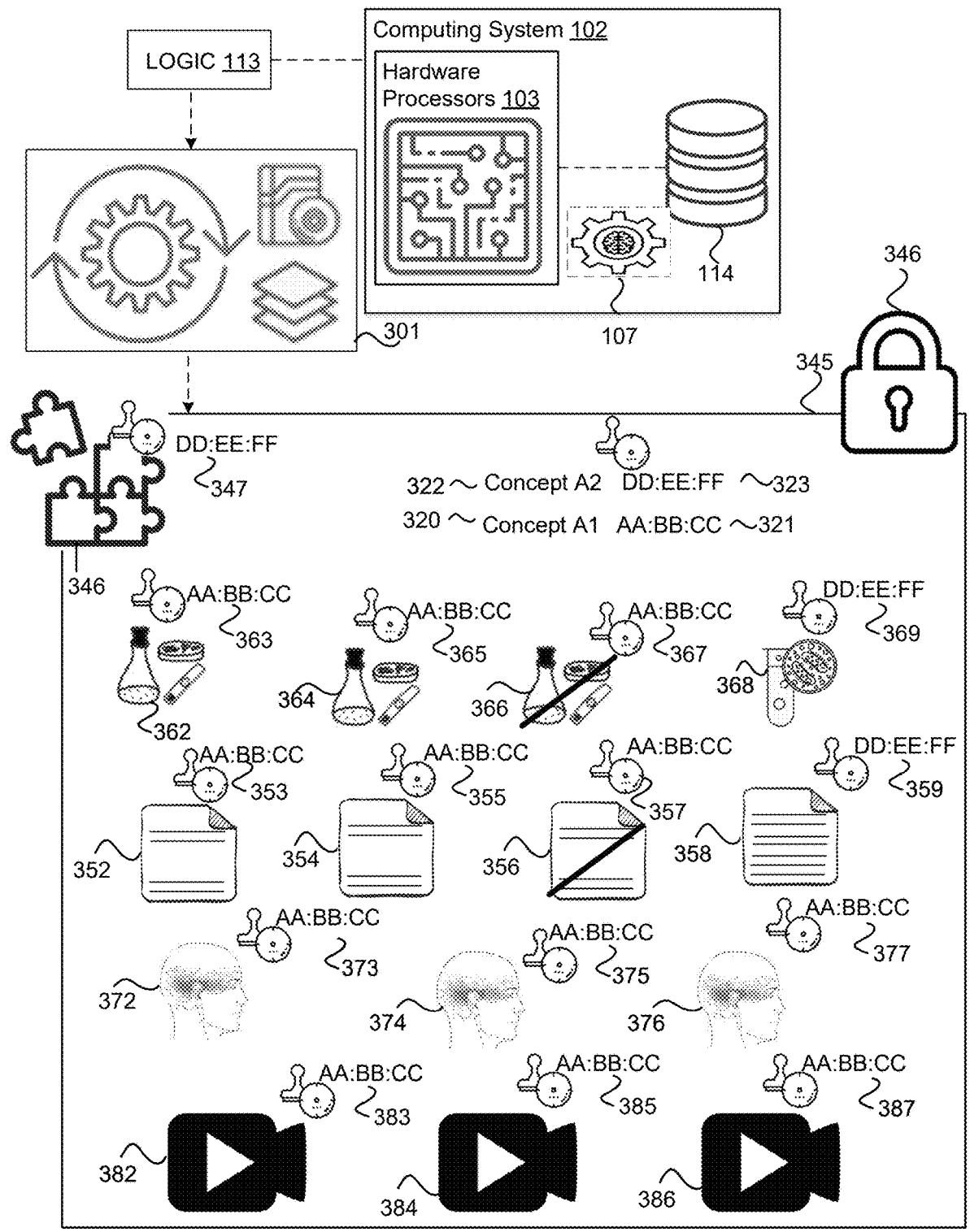
Figure 3C:
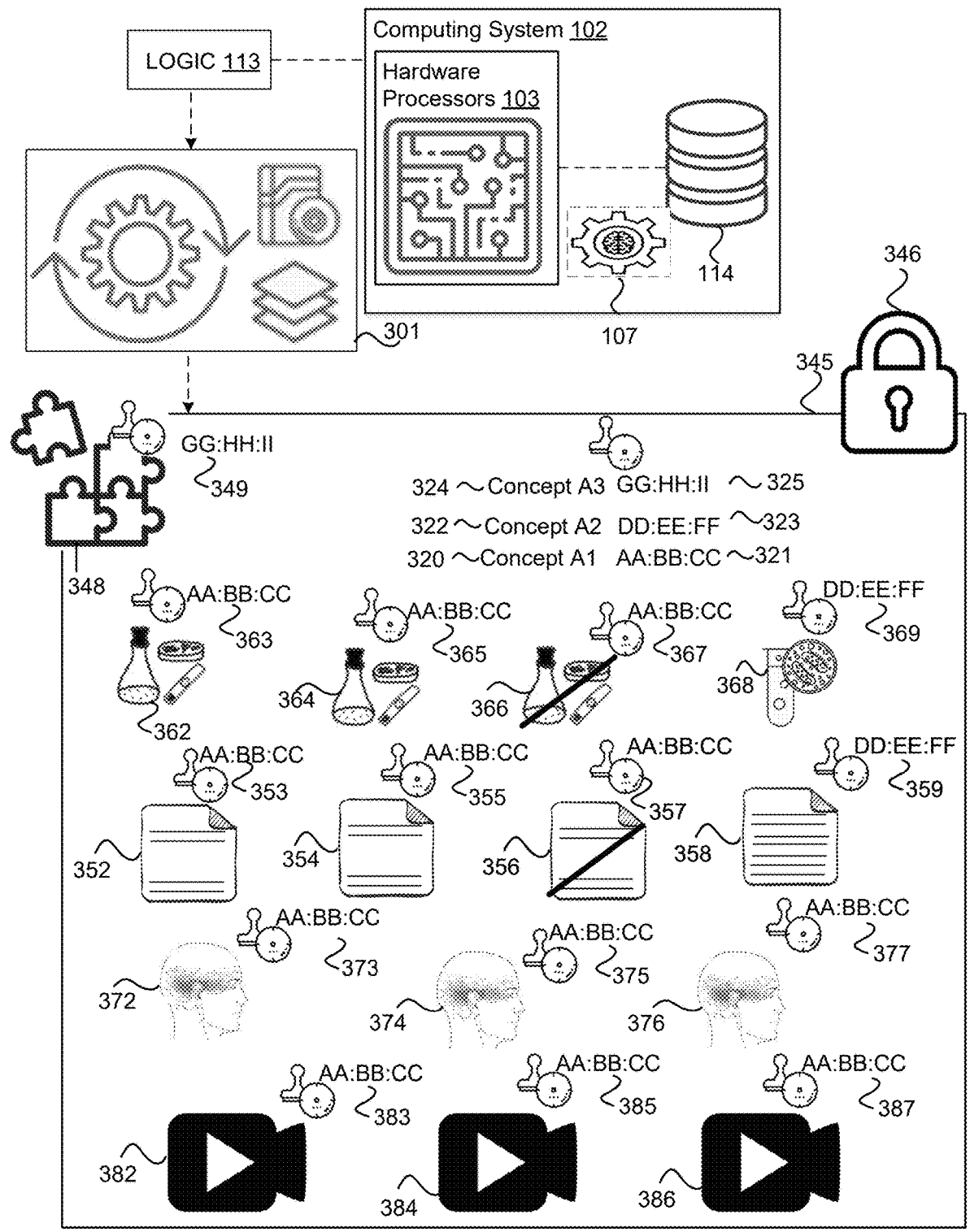

FIGS. 3A-3C illustrate exemplary operations of the logic 113 to store or encapsulate underlying or associated data within each of the concepts, such as the concept 250, and/or organize the underlying or associated data according to the concepts. The principles described in FIGS. 1, 2A and 2B are applicable to FIGS. 3A-3C. FIGS. 3A-3C illustrate that each concept, and/or a representation of each concept, constitutes or is associated with part of an independent compute environment 301, which may function independently from other compute environments corresponding to or associated with other concepts. The independent compute environment 301 may include infrastructure, tools, and resources to independently perform data recording, storage, evaluation, and analysis on each individual concept itself, apart from other independent compute environments. In some embodiments, the logic 113 may provision, instantiate, configure, orchestrate, and/or manage the independent compute environment 301.

In FIG. 3A, a representation 345 of a concept 320, denoted as the concept A1, may include underlying or associated data and reasoning 344, The concept 320 may be timestamped with a timestamp 321 to indicate a time at which the concept 320 was generated or a most recent update of the concept 320. In some embodiments, the timestamp 321 may coincide with a most recent timestamp of any of the underlying or associated data or reasoning 344. The underlying data may include, without limitation, results 352, 354, and 356, which may be manifested in a form of publications, manuscripts, or other textual articles or textual data. Although three such results are shown in FIG. 3A for illustration, any number of results may be included with a concept. The results 352, 354, and 356 may be timestamped by respective timestamps 353, 355, and 357 to indicate times at which the results 352, 354, and 356 were generated or most recent updates of the results 352, 354, and 356. The results 352, 354, and 356 may further be augmented by unpublished data including specific experimental parameters or protocols 362, 364, and 366, corresponding to the respective results 352, 354, and 356. The experimental parameters or protocols 362, 364, and 366 may encompass particular operations of instruments, preparation of instruments, calibration of instruments, preparation of samples, and/or cleanup of instruments. The experimental parameters or protocols 362, 364, and 366 may be timestamped by respective timestamps 363, 365, and 367 to indicate times at which the experimental parameters or protocols 362, 354, and 356 were generated or most recent updates of the experimental parameters or protocols 362, 354, and 356. The results 352, 354, and 356 may further be augmented by media or multimedia data, such as image data 372, 374, and 376 corresponding to the respective results 352, 354, and 356, and audiovisual data 382, 384, and 386 corresponding to the respective results 352, 354, and 356. For example, the image data 372, 374, and 376 and the audiovisual data 382, 384, and 386 may depict a process of an experiment actually being conducted, so that a viewer can simulate an experience of actually being where the experiment is conducted live. Such details in the underlying data are not captured within the limitations of a publication, but may further enhance the concepts. For example, the underlying data may establish a confidence level or reliability of a scientific assertion, compare protocols or parameters from different experiments used to test a same concept or different concepts, and provide a basis to formulate additional experiments to test related concepts or scientific assertions. The image data 372, 374, and 376 may be timestamped by respective timestamps 373, 375, and 377 to indicate times at which the image data 372, 374, and 376 was generated or most recent updates of the image data 372, 374, and 376. The audiovisual data 382, 384, and 386 may be timestamped by respective timestamps 383, 385, and 387 to indicate times at which the audiovisual data 382, 384, and 386 was generated or most recent updates of the audiovisual data 382, 384, and 386.

Also embedded with the concept may be the reasoning 344 which synthesizes the aforementioned underlying or associated data, indicates how the underlying data is used to substantiate the concept, and/or evaluations of strengths or limitations of the underlying data. The reasoning 344 may be provided manually, for example, by a user operating the computing device 120, or may be automatically generated by the logic 113. The reasoning 344 may be timestamped by a timestamp 345 to indicate times at which the results 352, 354, and 356 were generated or most recent updates of the results 352, 354, and 356.

Access to the underlying data may be defined according to one or more access control levels or policies 346. The logic 113 may evaluate whether or not, and an extent to which, a user has access to the underlying data based on a comparison of the access control levels or policies 346 and attributes of the user.

One manifested benefit of having concepts constitute part of an independent compute environment is that the concept 320 may be modified or updated, for example, when new data is ingested, old data is invalidated, and/or the reasoning is changed, as will be illustrated in FIGS. 3B and 3C. Therefore, the compute environment, or the logic, would not need to input an entirely new concept if some of the underlying data, parameters, or reasoning has changed.

FIG. 3B illustrates a scenario in which the previous results 356 illustrated in FIG. 3A have been modified by addition of new results, invalidation of previous results, or modification of existing results. In FIG. 3B, the previous results 356 illustrated in FIG. 3A are shown as crossed out to indicate that they have been invalidated or no longer applicable. Meanwhile, generation or ingestion of updated results 358, is memorialized by a timestamp 359 indicating a time of generation of the updated results 358. Additionally or alternatively, the previous parameters or protocols 366 may be modified or replaced by updated parameters or protocols 368, which are timestamped by a timestamp 369 indicating a time of generation of the updated parameters or protocols 368. In some embodiments, the updated results 358 may be attributed to or caused by the updated parameters or protocols 368. Accordingly, the previous reasoning 344 may be changed to updated reasoning 346 that now indicates how the updated parameters or protocols 368 and the updated results 348, instead of the parameters or protocols 366 and the results 346, are now used to arrive at an updated concept. The updated reasoning 346 is timestamped by a timestamp 347. Any one or combination of the updated results 358 and the updated parameters or protocols 368 may trigger, cause, or result in updating of the concept 320 to an updated concept 322, denoted as concept A2 and having a timestamp 323. In some embodiments, the updated concept 322 may negate or further qualify the concept or portions thereof. For example, if the concept 320 had indicated that "penicillin treats headaches," the updated concept 322 may indicate that "penicillin treats headaches if combined with one other antibiotic." The previous concepts, including the concept 320, may still be retained within the representation 345, and visible to a viewer as well as accessible to the logic 113.

FIG. 3C illustrates a scenario in which the underlying data and parameters remained unchanged from FIG. 3B, but the updated reasoning 346 has been further modified or updated, as indicated by updated reasoning 348, which is timestamped by a timestamp 349. For example, the updated reasoning 348 may indicate a change in how a subset (e.g., a portion or all of) of data is interpreted, alter weights of a subset of the underlying data and/or parameters, or provide a different theory, hypothesis, or conjecture. As a result of the updated reasoning 348, the updated concept 322 may be further updated to updated concept 324 which has a timestamp 325. Therefore, concepts may be updated due to updated reasoning even if the underlying data and parameters remain constant.

Figure 4:
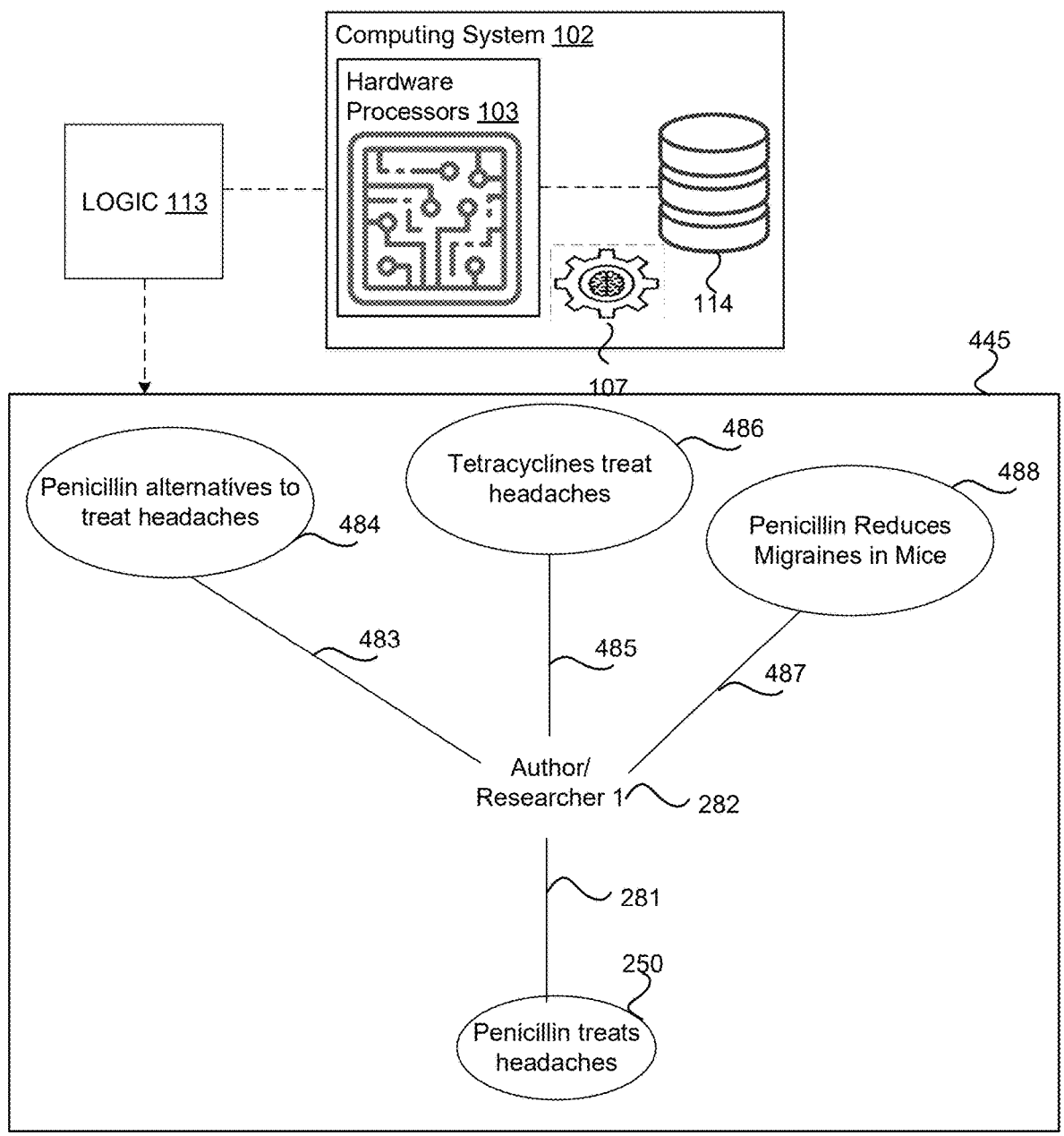
FIG. 4 illustrates, in accordance with various embodiments, an exemplary operation of linking additional concepts to other concepts and/or entities.

FIG. 4 illustrates an exemplary operation of the logic 113 to link additional concepts to other concepts and/or entities. The principles described in previous FIGS. 1-3 are applicable to FIG. 4. In FIG. 4, in representation 445, the author or researcher represented by the entity 282 of FIG. 2 may be linked to additional concepts or scientific assertions attributed to that author or researcher. For example, these additional concepts or scientific assertions 484, 486, and 488 may include, "penicillin alternatives to treat headaches," "tetracyclines treat headaches," and "penicillin reduces migraines in mice." The additional concepts or scientific assertions 484, 486, and 488 may be linked to the entity 282 via respective links 483, 485, and 487. Therefore, the representation 445 may provide a convenient mechanism to query scientific concepts or assertions based on author, which may be difficult if not impossible to accomplish via a standard semantic triplet representation.

Figure 5:
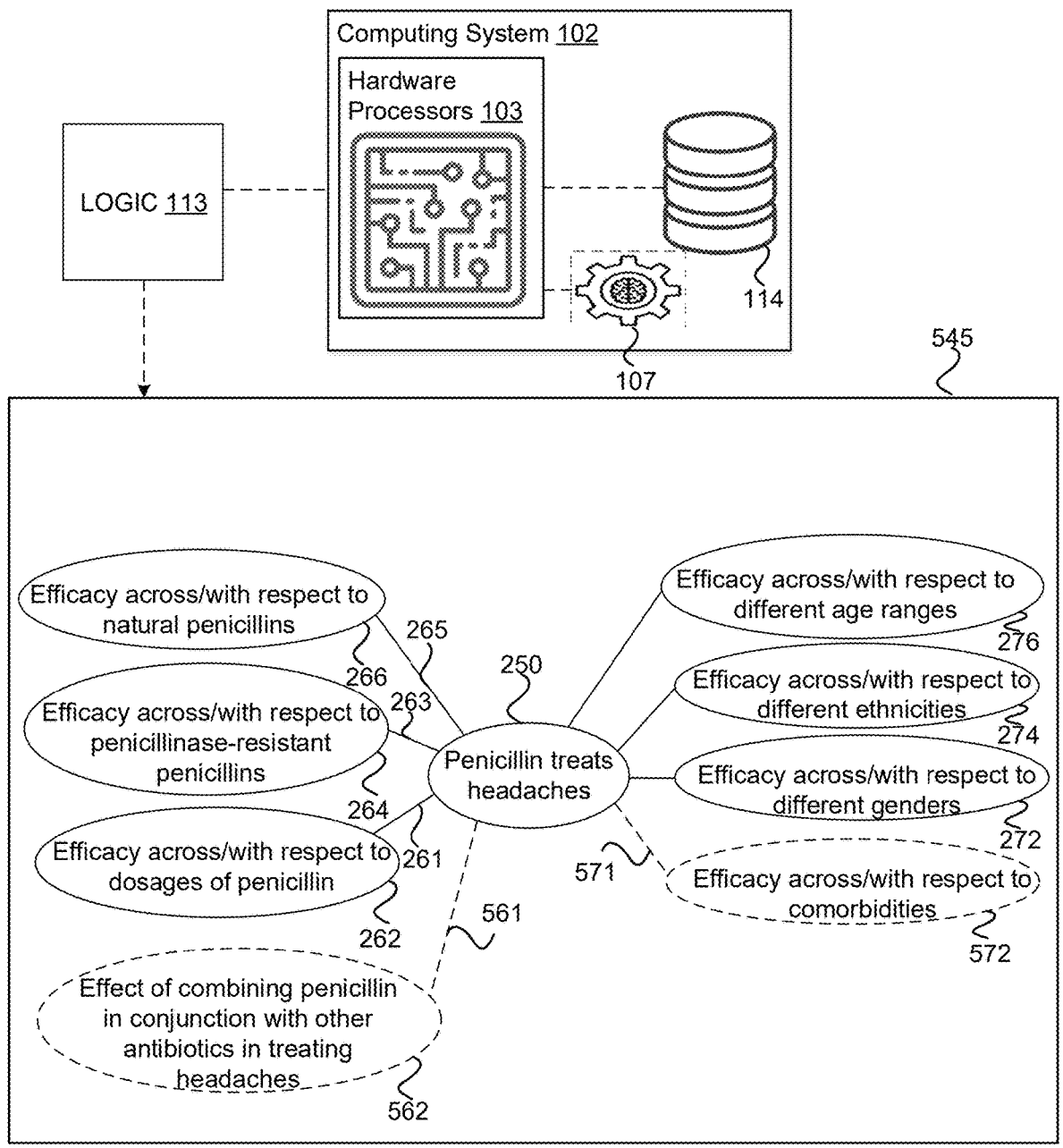
FIG. 5 illustrates, in accordance with various embodiments, an exemplary operation of formulating inferences of additional concepts or entities that were not previously existing or enumerated but may be supported by underlying data.

FIG. 5 illustrates an exemplary operation of the logic 113 to formulate inferences of additional concepts or entities that were not previously existing or enumerated. The principles described in previous FIGS. 1-4 are applicable to FIG. 5. In FIG. 5, in representation 545, the dashed circles and lines indicate inferences formulated from the existing concepts and/or underlying data. For example, the logic 113 may infer a concept 562, which indicates an effect of combining penicillin in conjunction with other antibiotics in treating headaches, and a concept 572, which indicates an efficacy of penicillin across or with respect to comorbidities of subject patients, in other words, how comorbidities in subject patients may affect an efficacy of penicillin in treating headaches. The concepts 562 and 572 are linked to the concept 250 by links 561 and 571, respectively.

The logic 113 may make such inferences based on an amount and/or reliability of ingested data of, or relating to, such concepts. The inference may be made at least in part by, or based on, a machine learning component or model such as the machine learning component or model 107. The machine learning component or model 107 may be trained by numerous training datasets either sequentially or in parallel. For example, the machine learning component or model 107 may be trained by a first training dataset that includes simulated or historical data of properly inferred concepts, and a second training dataset that includes simulated or historical data of improperly inferred concepts. Thus, the machine learning component or model 107 would be better able to distinguish between valid and invalid concepts. The machine learning component or model 107 may further obtain feedback from a user regarding one or more inferences. For example, a user may indicate whether or not the concepts 572 and 582 are valid, and/or an extent to which the concepts are valid. The machine learning component or model 107 may further be trained or modified based on the feedback. Such a mechanism of inferring concepts or entities would be immensely difficult, if not impossible, using data represented by standard semantic triplets. In particular, concepts or scientific assertions may not be represented in their full breadth or fidelity using semantic triplets, thus hindering or preventing the formulation of additional scientific concepts or assertions.

Figure 6:
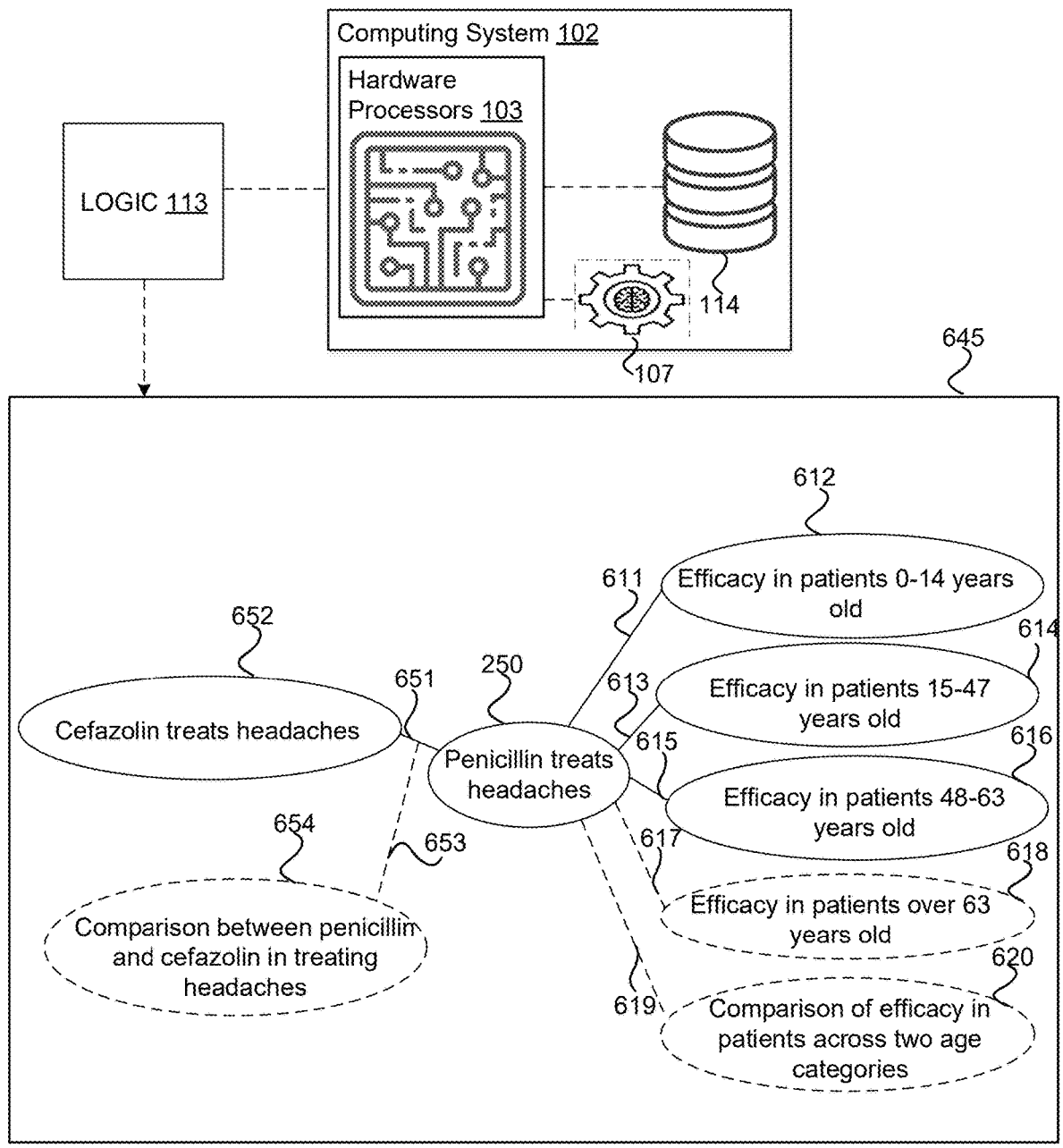
FIG. 6 illustrates, in accordance with various embodiments, an exemplary operation of formulating inferences of additional potential concepts or entities which are currently unsupported by underlying data, but may be suggested or proposed as further avenues for research or investigation.

FIG. 6 illustrates an exemplary operation of the logic 113 to formulate inferences of additional potential concepts or entities. The principles described in previous FIGS. 1-5 are applicable to FIG. 6. In FIG. 6, unlike in FIG. 5, the potential concepts or entities may not yet be supported by underlying data. In other words, the potential concepts or entities may lack supporting research, but may be suggested or proposed as further avenues for research or investigation. In representation 645, the concept or subconcept 276, indicative of efficacy of penicillin in treating headaches across different age ranges or with respect to particular age ranges, may be divided into subconcepts 612, 614, and 616, linked to the concept 250 via respective links 611, 613, and 615. The logic 113 may infer additional potential subconcepts 618 and 620, as linked to the concept 250 via respective links 617 and 619. The logic 113 may make such inferences based on a lack of underlying data specific to the concept, and/or based on similar subconcepts existing within a threshold proportion of other concepts, studies, or investigations. For example, the logic 113 may determine that other studies of other antibiotics or drugs also examined an efficacy in patents over the age of 63.

Additionally, the concept 250 may further be linked to a concept 652, via a link 651, that cefazolin (e.g., an alternative to penicillin) also treats headaches. The link 651 may indicate that potentially related or similar entities, in particular, penicillin and cefazolin, may both treat headaches. The logic 113 may infer an additional potential subconcept 654, indicative of a comparison between penicillin and cefazolin in treating headaches. The logic 113 may make such an inference based on a lack of uniformity of testing conditions, parameters, or protocols between studies to test the concepts 652 and 250. For example, the studies to test cefazolin may utilize different testing procedures, such as different durations or testing subjects, compared to the studies to test penicillin. Therefore, a direct comparison between the concepts 652 and 250 may not be viable based on currently existing data. Thus, the logic 113 may infer that a new study to directly compare penicillin and cefazolin, under uniform testing conditions, may be implemented.

The inference may be made at least in part by, or based on, a machine learning component or model such as the machine learning component or model 107. The machine learning component or model 107 may be trained by numerous training datasets either sequentially or in parallel. For example, the machine learning component or model 107 may be trained by a first training dataset that includes simulated or historical data of properly inferred potential concepts, and a second training dataset that includes simulated or historical data of improperly inferred potential concepts. Thus, the machine learning component or model 107 would be better able to distinguish between valid and invalid potential concepts. The machine learning component or model 107 may further obtain feedback from a user regarding one or more inferences. For example, a user may indicate whether or not the potential concepts 618, 620, and/or 654 are valid (e.g., worthy of conducting a further study), and/or an extent to which the concepts are valid. The machine learning component or model 107 may further be trained or modified based on the feedback. Such a mechanism of inferring concepts or entities would be immensely difficult, if not impossible, using data represented by standard semantic triplets. In particular, concepts or scientific assertions may not be represented in their full breadth or fidelity using semantic triplets, thus hindering or preventing the formulation of additional potential scientific concepts or assertions.

Figure 7:
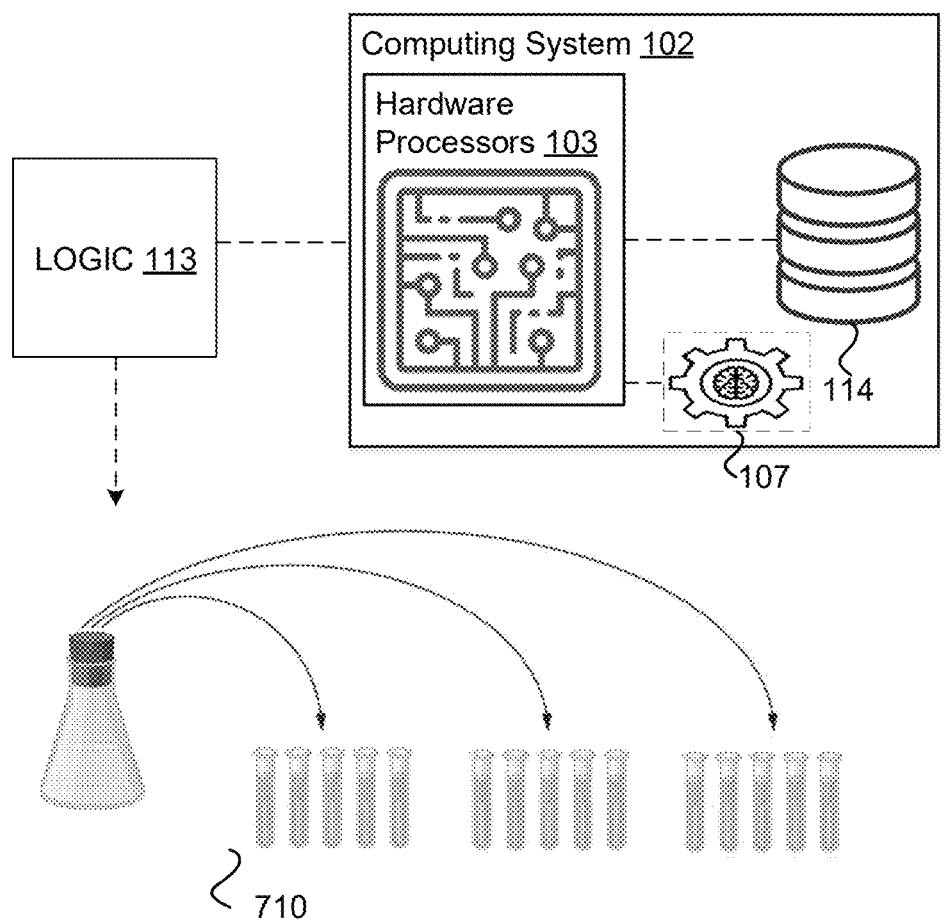
FIG. 7 illustrates, in accordance with various embodiments, an exemplary operation of formulating a new experiment.

FIG. 7 illustrates an exemplary operation of the logic 113 to formulate a new experiment 710. The principles described in previous FIGS. 1-6 are applicable to FIG. 7. In FIG. 7, the logic 113 may, for example, from one or more inferences made according to the principle depicted in FIG. 6, design a new experimental protocol in order to test or validate a potential concept or scientific assertion inferred, such as the potential concepts 618, 620, and/or 654 of FIG. 6. The design of the new experimental protocol may encompass establishing parameters and procedures including preparations of instruments, samples, and/or subjects prior to the experiment or study, and cleanup of instruments and/or samples following the experiment or study. The parameters and procedures may be established based at least in part on parameters and procedures in other studies linked to the concept 250, and/or from other concepts. In some embodiments, the experimental protocol may be established at least in part by, or based on, a machine learning component or model such as the machine learning component or model 107. The logic 113 may receive feedback from a user regarding the experimental protocol, regarding a validity and/or an extent thereof of the experimental protocol. The machine learning component or model 107 may further be trained based on the feedback. Following the design of the experiment, the one or more hardware processors 103 may implement the design of the experiment, and/or transmit the design of the experiment to another hardware processor which may implement the experiment. The another hardware processor may be within the computing system 102 or be part of another computing system.

Figure 8:
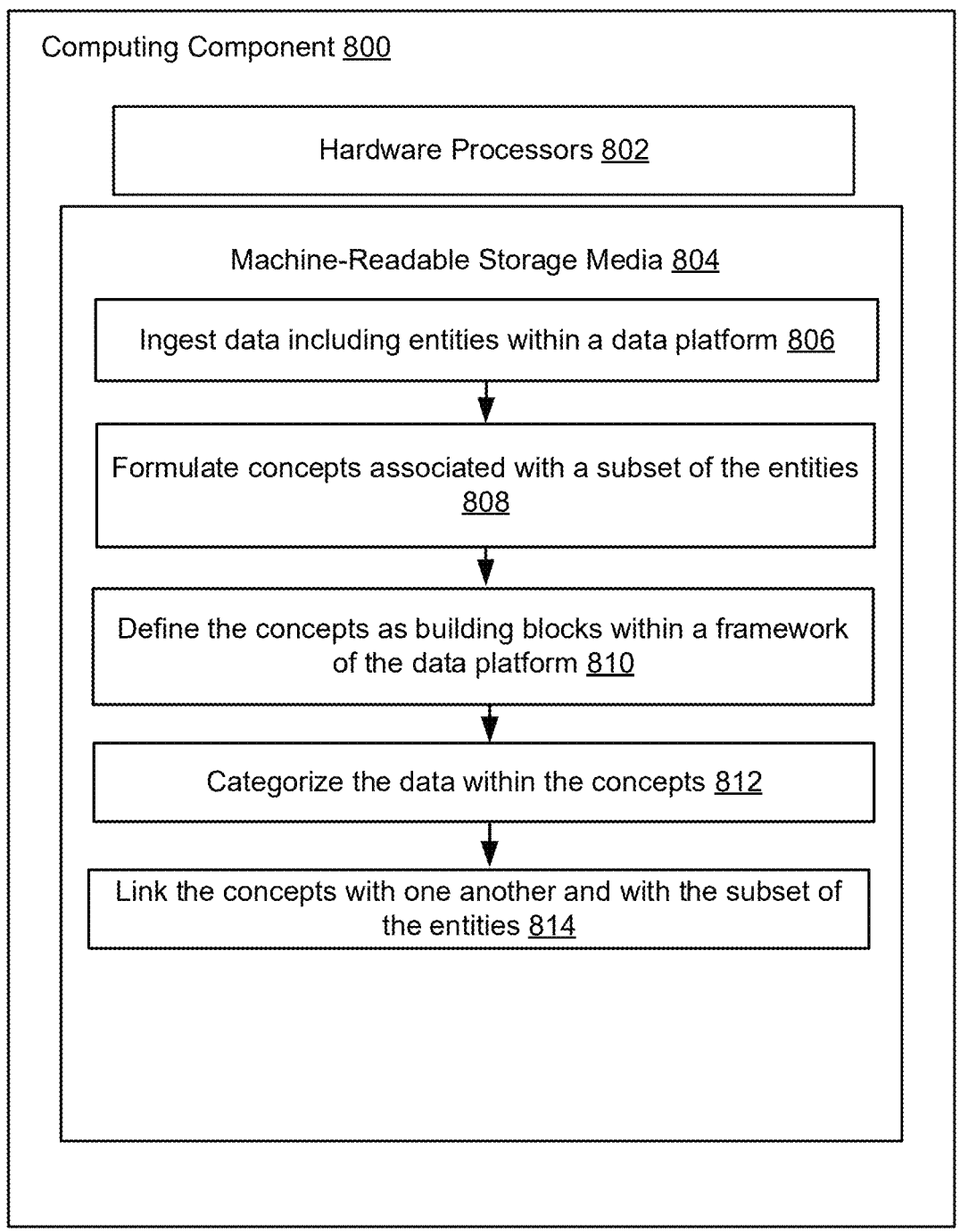
FIG. 8 illustrates a flowchart of an example method consistent with FIGS. 1-7, embodied in a computing component.

FIG. 8 illustrates a computing component 800 that includes one or more hardware processors 802 and machine-readable storage media 804 storing a set of machine-readable/machine-executable instructions that, when executed, cause the hardware processor(s) 802 to perform an illustrative method of ingesting data, and formulating concepts from the ingested data, among other steps. It should be appreciated that there can be additional, fewer, or alternative steps performed in similar or alternative orders, or in parallel, within the scope of the various embodiments discussed herein unless otherwise stated. The computing component 800 may be implemented as the computing system 102 of FIGS. 1-7. The hardware processors 802 may be implemented as the hardware processors 103 of FIGS. 1-7. The machine-readable storage media 804 may be implemented as the machine-readable storage media 112 of FIGS. 1-7, and may include suitable machine-readable storage media described in FIG. 9.

At step 806, the hardware processor(s) 802 may execute machine-readable/machine-executable instructions stored in the machine-readable storage media 804 to ingest data within a data platform, such as within the segment 140 of the data platform 130 in FIG. 1. As alluded to with respect to FIG. 1, the ingested data may include entities, relationships among the entities, and/or qualifications regarding the entities and/or relationships. The relationships may include, for example, ontological relationships, causal relationships, or correlative relationships, and/or may be expressive of a scientific theory, conjecture, or explanation. Applying the aforementioned penicillin example, a concept may encompass, "penicillin treats headaches a given percentage of the time." Here, "penicillin" and "headaches" may refer to entities and treating may refer to a relationship, while a given percentage of the time may refer to a further qualification of treating. A concept may also include additional complexity such as, "a certain dosage, taken at a particular frequency," which further qualifies the entity penicillin.

At step 808, the hardware processor(s) 802 may execute machine-readable/machine-executable instructions stored in the machine-readable storage media 804 to formulate concepts associated with a subset (e.g., some or all) of the entities. The formulation of the concepts may be based on user input and/or an inference, for example, from a machine learning model. In the scenario of a machine learning model, such as the machine learning model 107, providing an inference, the machine learning model may be trained based on numerous training datasets either sequentially or simultaneously. One training dataset may include proper inferences of concepts based on underlying data while a second training dataset may include improper inferences of concepts based on underlying data.

At step 810, the hardware processor(s) 802 may execute machine-readable/machine-executable instructions stored in the machine-readable storage media 804 to define the concepts as building blocks within a framework of the data platform. Utilizing concepts, rather than entities, as building blocks within such a framework confers benefits of more fully expressing scientific and social scientific concepts while endowing the concepts with a level of trust or confidence in part because the concepts are undergirded by data that is categorized, embedded, or encapsulated within the concepts. Additionally, formulating inferences that combines different concepts, and/or formulating new or potential concepts, is made possible as a result of the clear, thorough expression of concepts which may be manifested as scientific assertions. Each concept may be represented as a node. A user may perform a query within each concept or node, resulting in more specific queries tailored to concepts and faster retrieval of requested data. Additionally, each concept may constitute part of an independent compute environment, as provisioned by the hardware processors 802, and illustrated in FIGS. 3A-3C.

At step 812, the hardware processor(s) 802 may execute machine-readable/machine-executable instructions stored in the machine-readable storage media 804 to categorize the ingested data from step 806 within each of the concepts. As mentioned above with reference to step 810, the categorization of the ingested data upholds a level of trust or confidence in the concepts.

At step 814, the hardware processor(s) 802 may execute machine-readable/machine-executable instructions stored in the machine-readable storage media 804 to link the concepts with one another and with the subset of the entities. Such a linking provides richer content of information compared to standard semantic triplets, in which an entity is linked to another entity. Expression using standard semantic triplets limits capabilities of expressing a specific manner in which the entities are linked.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software. Operating systems control and schedule computer processes for execution, perform memory management, provide file system, networking, I/O services, and provide a user interface functionality, such as a graphical user interface ("GUI"), among other things.

Figure 9:
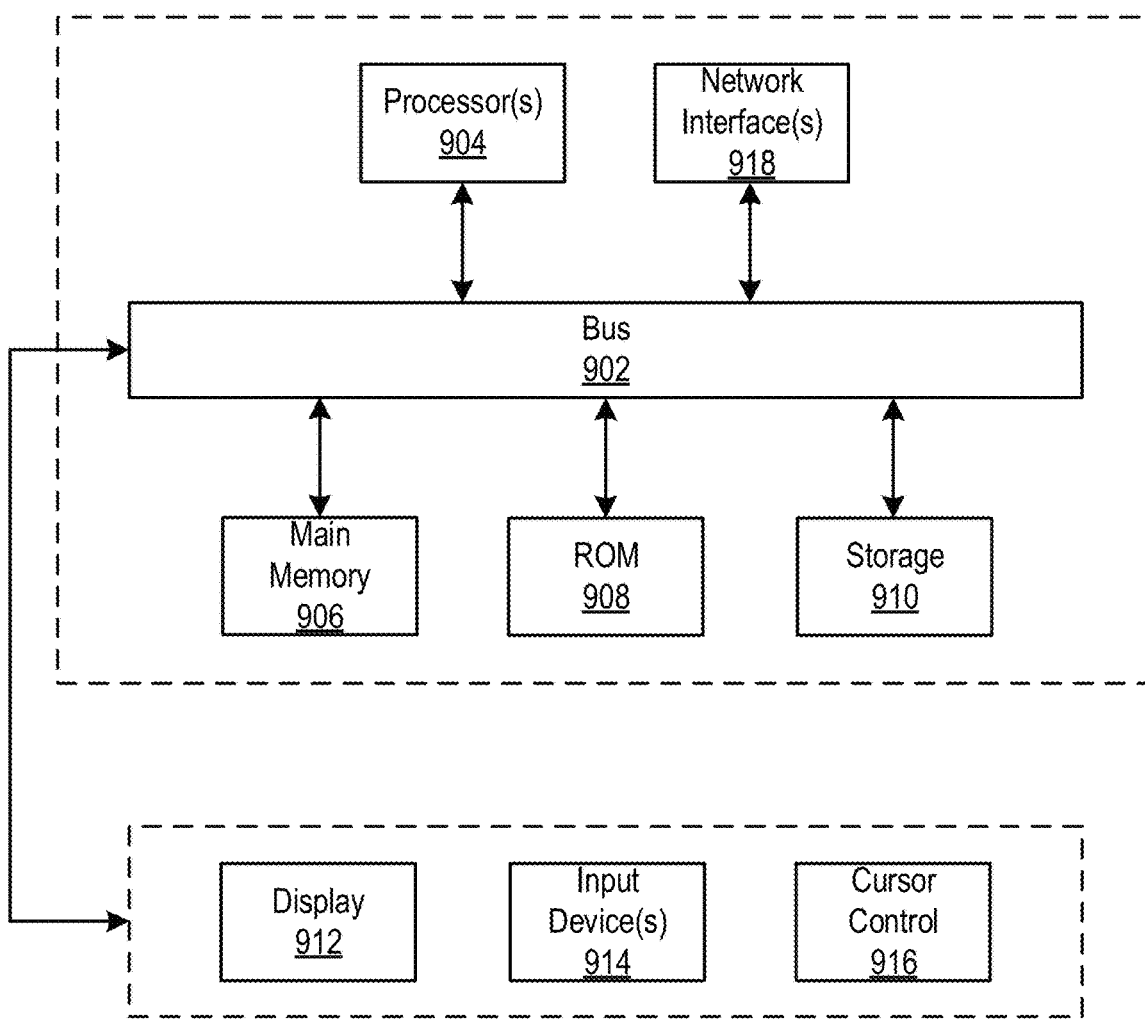
FIG. 9 illustrates a block diagram of an example computer system in which any of the embodiments described herein may be implemented.

FIG. 9 is a block diagram that illustrates a computer system 900 upon which any of the embodiments described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a cathode ray tube (CRT) or LCD display (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may retrieves and executes the instructions. The instructions received by main memory 906 may optionally be stored on storage device 910 either before or after execution by processor 904.

The computer system 900 also includes a communication interface 918 coupled to bus 902. Communication interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be removed, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that "logic," a "system," "data store," and/or "database" may comprise software, hardware, firmware, and/or circuitry. In one example, one or more software programs comprising instructions capable of being executable by a processor may perform one or more of the functions of the data stores, databases, or systems described herein. In another example, circuitry may perform the same or similar functions. Alternative embodiments may comprise more, less, or functionally equivalent systems, data stores, or databases, and still be within the scope of present embodiments. For example, the functionality of the various systems, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment. A component being implemented as another component may be construed as the component being operated in a same or similar manner as the another component, and/or comprising same or similar features, characteristics, and parameters as the another component.

The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

The invention claimed is:

1. A computing system, comprising:
   one or more processors; and
   memory storing instructions that, when executed by the one or more processors, cause the computing system to perform:
   ingesting data within a data platform, the data comprising entities;
   generating concepts associated with an entity subset of the entities, the concepts comprising relationships among the entity subset, wherein each concept is associated with a particular data subset of the data;
   instantiating a plurality of independently operating compute environments, wherein each of the independently operating compute environments corresponds to a particular generated concept, the instantiating comprising:
   configuring and allocating computing resources comprising data recording resources, storage resources, and analysis resources for each independently operating compute environment;
   ingesting a corresponding particular data subset, experiment parameters or protocols underlying the corresponding particular data subset, and applied particular reasoning corresponding to each particular generated concept into each independently operating compute environment;
   enforcing different access control policies for the corresponding particular data subset compared to the each particular generated concept;
   obtaining a modification to at least a particular generated concept corresponding to a particular independently operating compute environment;
   within the particularly independently operating compute environment, recording the modification to the particular concept, linking the modification to the particular concept by recording a chronological sequence of when and how the modification of the particular generated concept occurred, and linking the modification to the particular concept to a particular modification in the corresponding particular data subset, the applied particular reasoning, or the experiment parameters or protocols;
   orchestrating the independent compute environment to perform data recording, storage, and analysis;
   linking at least a concept subset of the generated concepts corresponding to each of the independently operating compute environments with one another and with the subset of the entities;
   inferring, based on the generated concepts, a potential concept or subconcept;
   determining a protocol comprising parameters and procedures to test the potential concept or subconcept;
   implementing the protocol, wherein the implementing of the protocol comprises one or more physical procedures to prepare instruments, samples, or subjects, and cleanup instructions or samples; and
   displaying, on an interface, one or more results in response to the implemented protocol.

2. The computing system of claim 1, wherein the generated concepts further comprise one or more qualifications applied to a subset of the entities or the relationships.

3. The computing system of claim 1, wherein the generating of the concepts is based at least in part on a user input indicative of one or more of the concepts.

4. The computing system of claim 1, wherein:
the generating of the concepts is based at least in part on inferences using a trained machine learning model; and
the training of the machine learning model is based on a first training dataset comprising properly inferred concepts and a second training dataset comprising improperly inferred concepts.

5. The computing system of claim 1, wherein the instructions further cause the system to perform:
determining levels of reliability of two of the generated concepts; and
in response to determining that the levels of reliability of two of the generated concepts satisfy a threshold level, inferring a new concept that combines the two of the generated concepts.

6. The computing system of claim 1, wherein the instructions further cause the system to perform:
receiving an indication of one or more subconcepts that further elaborate on an aspect of an entity of the entities or a relationship of the relationships;
storing associated data within the one or more subconcepts; and
linking the one or more subconcepts to a corresponding concept.

7. The computing system of claim 1, wherein the instructions further cause the system to perform:
receiving a request from a user to query within a generated concept of the generated concepts;
determining an access control level of the user specific to the generated concept;
in response to determining that the user satisfies the access control level, conducting the query;
retrieving data in accordance with the request; and
transmitting the data to the user.

8. The computing system of claim 1, wherein the categorization of the data comprises storing corresponding textual and multimedia data in association with the generated concepts.

9. The computing system of claim 1, wherein the instructions further cause the computing system to perform:
linking each of the concepts in the independent compute framework.

10. The computing system of claim 1, wherein the implementing of the protocol comprises one or more physical procedures to calibrate the instruments.

11. A computer-implemented method of a computing system, comprising:
ingesting data within a data platform, the data comprising entities;
generating concepts associated with an entity subset of the entities, the concepts comprising relationships among the entity subset, wherein each concept is associated with a particular data subset of the data;
instantiating a plurality of independently operating compute environments, wherein each of the independently operating compute environments corresponds to a particular generated concept, the instantiating comprising:
configuring and allocating computing resources comprising data recording resources, storage resources, and analysis resources for each independently operating compute environment;
ingesting a corresponding particular data subset, experiment parameters or protocols underlying the corresponding particular data subset, and applied particular reasoning corresponding to each particular generated concept into each independently operating compute environment;
enforcing different access control policies for the corresponding particular data subset compared to the each particular generated concept;
obtaining a modification to at least a particular generated concept corresponding to a particular independently operating compute environment;
within the particularly independently operating compute environment, recording the modification to the particular concept, linking the modification to the particular concept by recording a chronological sequence of when and how the modification of the particular generated concept occurred, and linking the modification to the particular concept to a particular modification in the corresponding particular data subset, the applied particular reasoning, or the experiment parameters or protocols;
orchestrating the independent compute environment to perform data recording, storage, and analysis;
linking at least a concept subset of the generated concepts corresponding to each of the independently operating compute environments with one another and with the subset of the entities;
inferring, based on the generated concepts, a potential concept or subconcept;
determining a protocol comprising parameters and procedures to test the potential concept or subconcept;
implementing the protocol, wherein the implementing of the protocol comprises one or more physical procedures to prepare instruments, samples, or subjects, and cleanup instructions or samples; and
displaying, on an interface, one or more results in response to the implemented protocol.

12. The computer-implemented method of claim 11, wherein the generated concepts further comprise one or more qualifications applied to a subset of the entities or the relationships.

13. The computer-implemented method of claim 11, wherein:
the generating of the concepts is based at least in part on inferences using a trained machine learning model; and
the training of the machine learning model is based on a first training dataset comprising properly inferred concepts and a second training dataset comprising improperly inferred concepts.

14. The computer-implemented method of claim 11, further comprising:
determining levels of reliability of two of the generated concepts; and
in response to determining that the levels of reliability of two of the generated concepts satisfy a threshold level, inferring a new concept that combines the two of the generated concepts.

15. The computer-implemented method of claim 11, further comprising:
receiving an indication of one or more subconcepts that further elaborate on an aspect of an entity of the entities or a relationship of the relationships;
storing associated data within the one or more subconcepts; and
linking the one or more subconcepts to a corresponding concept.

16. The computer-implemented method of claim 11, further comprising:

receiving a request from a user to query within a concept of the concepts;
determining an access control level of the user specific to the concept;
in response to determining that the user satisfies the access control level, conducting the query;
retrieving data in accordance with the request; and
transmitting the data to the user.

\* \* \* \* \*